US005523944A

United States Patent [19]
Kröger

[11] Patent Number: 5,523,944
[45] Date of Patent: Jun. 4, 1996

[54] ARRANGEMENT FOR AUTOMATICALLY CHANGING THE TRANSMISSION RATIO OF A SPEED-CHANGE GEARBOX OF A MOTOR VEHICLE WITH THE EFFECT OF CHANGING TO A HIGHER GEAR

[75] Inventor: Torsten Kröger, Stuttgart, Germany

[73] Assignee: Mercedes-Benz AG, Stuttgart, Germany

[21] Appl. No.: 98,060

[22] Filed: Jul. 28, 1993

[30]  Foreign Application Priority Data

Aug. 8, 1992 [DE] Germany ............ 42 26 315.8

[51] Int. Cl.⁶ .................................. B60K 41/04
[52] U.S. Cl. ................. 364/424.1; 477/125; 477/138; 477/154
[58] Field of Search ................ 364/424.1; 477/120, 477/125, 131, 134, 138, 154, 904

[56]  References Cited

U.S. PATENT DOCUMENTS

| | | | |
|---|---|---|---|
| 3,683,720 | 8/1972 | Wakamatsu et al. | 475/62 |
| 3,710,630 | 1/1973 | Sumiyoshi et al. | 475/63 |
| 3,713,351 | 1/1973 | Sakakibara et al. | 477/61 |
| 3,724,293 | 4/1973 | Wakamatsu et al. | 477/131 |
| 3,724,295 | 4/1973 | Wakamatsu et al. | 477/125 |
| 3,727,488 | 4/1973 | Wakamatsu et al. | 477/131 |
| 3,747,438 | 7/1973 | Toyoda et al. | 477/120 |
| 4,044,634 | 8/1977 | Florus et al. | 477/154 |
| 4,991,096 | 2/1991 | Glowczewski et al. | 364/424.1 |
| 4,998,200 | 3/1991 | Glowczewski et al. | 364/424.1 |

FOREIGN PATENT DOCUMENTS

| | | |
|---|---|---|
| 0000960 | 3/1979 | European Pat. Off. . |
| 0406616 | 1/1991 | European Pat. Off. . |
| 0438643 | 7/1991 | European Pat. Off. . |
| 2545567 | 11/1984 | France . |
| 4020201 | 1/1991 | Germany . |
| 4204594 | 9/1992 | Germany . |
| 1586273 | 3/1981 | United Kingdom . |
| WO89/01421 | 2/1989 | WIPO . |

*Primary Examiner*—Collin W. Park
*Attorney, Agent, or Firm*—Evenson, McKeown, Edwards & Lenahan

[57]  ABSTRACT

An electronically controlled arrangement for changing the transmission ratio of a speed-change gearbox of a drive assembly of a motor vehicle, in which a change with the effect of changing-up is prevented by an inhibiting signal formed as a function of parameters of the control of the drive assembly or of the driving state. The change is re-authorized when the accelerator pedal again reaches a significant position determined by a change in level of the inhibiting signal and when a delay time determined by the actuation of the accelerator pedal has elapsed.

18 Claims, 3 Drawing Sheets

5,523,944

ARRANGEMENT FOR AUTOMATICALLY CHANGING THE TRANSMISSION RATIO OF A SPEED-CHANGE GEARBOX OF A MOTOR VEHICLE WITH THE EFFECT OF CHANGING TO A HIGHER GEAR

BACKGROUND AND SUMMARY OF THE INVENTION

The present invention relates to an arrangement for automatically changing the transmission ratio of a speed-change gearbox arranged downstream of a drive engine in a power train of a motor vehicle to provide a changing-up to a higher gear, comprising an electronic control unit that forms a changing-up signal as a function both of a load of the drive engine and of a driving speed of the motor vehicle and an electro-hydraulic changing device connected by a changing-up line to the electronic control unit and receiving from the electronic control unit the changing-up signal. A first switch is arranged in the changing-up line that prevents the changing-up by setting a bistable multivibrator, the first switch being opened when the changing-up signal is present. A bistable multivibrator having a setting input and a resetting input is provided and is coupled to the first switch. A detection stage responsive to a change in level of an inhibiting signal is provided for preventing the changing-up and outputting a signal for setting the bistable multivibrator. The resetting input of the bistable multivibrator for a re-authorization of the changing-up is provided, by closure of the first switch, with a signal which corresponds to a significant position of an accelerator pedal and which is output when the accelerator pedal has been actuated into the significant position after the setting of the bistable multivibrator. A displacement transducer is controllably connected to an accelerator pedal and coupled to the resetting input of the bistable multivibrator. A threshold value stage is coupled between the displacement transducer and the resetting input, the threshold value stage determining the significant position. A delay element which is switchable on in response to the changing-up signal is coupled to a second switch that is arranged with the switch drivable by the bistable multivibrator in series with the changing-up line, the delay element during its delay time driving the second switch in an opening direction.

In a known arrangement of this kind 10 (DE 27 38 914 C2), the inhibiting signal for setting the bistable multivibrator, and thus for preventing changing-up of a step-by-step variable transmission, is triggered by quickly releasing the accelerator pedal. The threshold value stage for determining the significant position of the accelerator pedal at which the signal for resetting the bistable multivibrator (and thus for re-authorizing changing-up) is output, has a constant threshold value so that the significant position is the same for all changing-up operations and in all driving states. These driving states must be simply travelled through, by simply pressing down the accelerator pedal, in order to trigger the signal for the re-authorization of the changing-up by resetting the bistable multivibrator.

In contrast with the above, the object upon which the invention is based is essentially to orient the conditions for the re-authorization of the change in transmission ratio with the effect of changing-up, irrespective of how and with which parameters the inhibiting signal for preventing the change in transmission ratio has been formed, more towards the intentions of the driver with respect to changing-over of the gears during driving. Since if the driver does not intend to trigger a change in the transmission ratio with the effect of changing-up when he rapidly releases the accelerator pedal, a subsequent pressing down of the accelerator pedal cannot necessarily be taken to imply that the driver desires the opposite.

This and other objects are achieved by the present invention which provides an arrangement for automatically changing the transmission ratio of a speed-change gearbox arranged downstream of a drive engine in a power train of a motor vehicle to provide a changing-up to a higher gear, comprising an electronic control unit that forms a changing-up signal as a function both of a load of the drive engine and of a driving speed of the motor vehicle and an electro-hydraulic changing device connected by a changing-up line to the electronic control unit and receiving from the electronic control unit the changing-up signal. A first switch is arranged in the changing-up line that prevents the changing-up by setting a bistable multivibrator, the first switch being opened when the changing-up signal is present. A bistable multivibrator having a setting input and a resetting input is provided and is coupled to the first switch. A detection stage responsive to a change in level of an inhibiting signal is provided for preventing the changing-up and outputting a signal for setting the bistable multivibrator. The resetting input of the bistable multivibrator for a reauthorization of the changing-up is provided, by closure of the first switch, with a signal which corresponds to a significant position of an accelerator pedal and which is output when the accelerator pedal has been actuated into the significant position after the setting of the bistable multivibrator. A displacement transducer is controllably connected to an accelerator pedal and coupled to the resetting input of the bistable multivibrator. A threshold value stage is coupled between the displacement transducer and the resetting input, the threshold value stage determining the significant position. A delay element which is switchable on in response to the changing-up signal is coupled to a second switch that is arranged with the switch drivable by the bistable multivibrator in series with the changing-up line, the delay element during its delay time driving the second switch in an opening direction. The threshold value stage has a threshold value which is variable as a function of the position of the accelerator pedal and is settable to a constant offset above an instantaneous position of the accelerator pedal and is lockable onto when the delay element is switched on, so that the significant position merely deviates by the constant offset from an instantaneous position in which the accelerator pedal was located when the second switch opens. The second switch is additionally drivable by a first delay device which operates as a function both of the delay element and of the threshold value stage in such a way that the second switch remains opened over a delay time determined by the first delay device when the signal corresponding to the significant position occurs and switches on the first delay device.

In the arrangement according to the invention, the significant position of the accelerator pedal for re-authorizing the change in transmission ratio with the effect of changing-up is not the same for all changes in transmission ratio with the effect of changing-up and for all driving states but is always dependent (specifically varying by a constant offset) from that position in which the accelerator pedal was located when there was a change in level of the inhibiting signal for preventing the change in transmission ratio with the effect of changing-up. However, in this case, merely moving this significant position for re-authorization of the change in transmission ratio with the effect of changing-up is not sufficient, but rather the change in transmission ratio with the effect of changing-up remains initially inhibited for a predetermined delay time. Additionally, for a specific time period which is determined by the delay device which contains the threshold value stage for the significant accelerator pedal position, the switch in the changing-up line, which switch is driven by the delay element, remains open and thus at the same time prevents the change in transmission ratio with the effect of changing-up. If an inhibiting signal which again prevents the change in transmission ratio with the effect of changing-up does not occur within the delay time, the change in transmission ratio with the effect of changing up is authorized again after the delay time has elapsed.

In certain embodiments of the invention, the re-authorization of the change in transmission ratio with the effect of changing-up is associated with the condition that the driver keeps the accelerator pedal in a constant position or slightly releases the accelerator pedal, that is to say does not accelerate and thus indicates that he wishes to maintain the current driving speed. Thus, in the entire region above the respective changing-up line of the gear-change program, a change in transmission ratio with the effect of changing-up is also prevented from being carried out while the driver is accelerating.

In certain embodiments of the invention, one and the same monostable multivibrator is used in conjunction with a J–K master-slave multivibrator to determine the delay time of the delay element which can be switched on as a function of the changing-up signal, to determine the delay time of the delay device which contains the threshold value stage for resetting the bistable multivibrator, and to determine the delay time for the delay device which contains the detection stage for the direction of movement of the accelerator pedal.

In certain embodiments of the invention, the locking onto the threshold value which determines the significant position of the accelerator pedal for re-authorization is maintained for positive movements having the effect of an increase in power but can be cancelled in the case of negative movements having the effect that the threshold value is follow-up controlled downwards when the accelerator pedal is released. In such a driving state, the signal for the re-authorization of the change in transmission ratio with the effect of changing up is accordingly triggered, but the change in transmission ratio with the effect of changing-up itself is not triggered, when the driver slightly accelerates, as a result of which, however, the delay time of the monostable multivibrator, and thus the interrupting of the changing-up line, is triggered or extended.

An embodiment of the arrangement according to the invention which is advantageous in terms of circuit technology, for cancelling the locking onto, and follow up control of, the threshold value is also provided.

An embodiment, which is advantageous in terms of circuit technology, for locking onto the threshold value allowing for the restrictive actuation of the accelerator pedal in the arrangement according to the invention is provided.

An embodiment, which is advantageous in terms of circuit technology, of the arrangement according to the invention uses one and the same monostable multivibrator for determining the delay time of the delay element which is influenced by the changing-up signal, the delay time of the delay device which contains the threshold value stage for the re-authorization, and the delay time of the delay device which contains the detection stage for the direction of movement of the accelerator pedal is provided.

An advantageous embodiment of the arrangement according to the invention in which the inhibiting signal for setting the bistable multivibrator is not formed as a function of a rapid release of the accelerator pedal is provided.

An advantageous embodiment of the arrangement according to the invention in which the inhibiting signal for setting the bistable multivibrator is triggered as a function of a rapid release of the accelerator pedal is provided.

The invention can be applied, for example, both in speed-change gearboxes with step-by-step change of the transmission ratio and also in speed-change gearboxes with infinitely variable change of the transmission ratio.

Other objects, advantages and novel features of the present invention will become apparent from the following detailed description of the invention when considered in conjunction with the accompanying drawings.

DETAILED DESCRIPTION OF THE DRAWINGS

Figure 1:
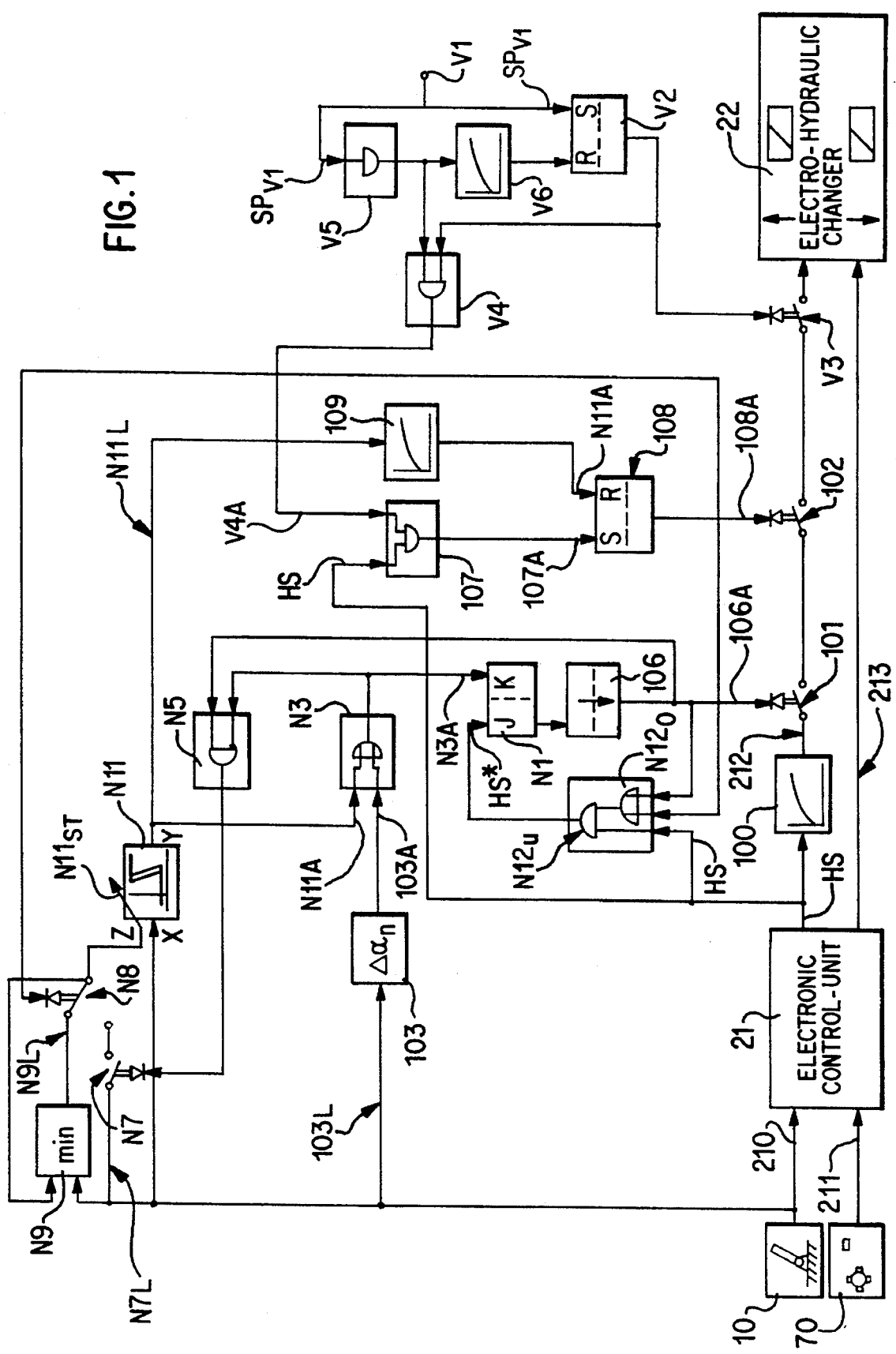
FIG. 1 shows a block circuit diagram of an arrangement according to an embodiment of the present invention for automatically changing a step-by-step variable transmission to a higher gear in which the inhibiting signal for preventing the changing-up is triggered independently of the actuation of the accelerator pedal.

The two embodiments of FIGS. 1 and 2 correspond with respect to the following features, and so will be described in common where these features correspond.

An electronic control unit 21 of a step-by-step transmission (not illustrated in greater detail) of a motor vehicle is connected on the output side via a changing-up line 212 and a changing-back line 213 to an electro-hydraulic changing device 22 of the step-by-step variable transmission. The control device 21 is connected on its input side to a line 210 which originates from a displacement transducer which responds to the actuation of an accelerator pedal 10, and to a line 211 which originates from a sensor 70 which detects the speed of revolution of the transmission output shaft of the step-by-step variable transmission.

Figure 5:
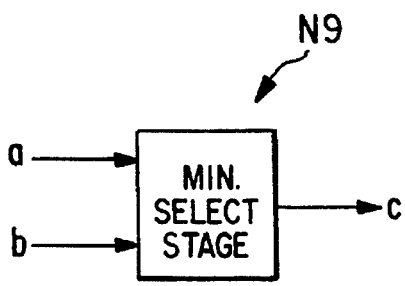
FIG. 5 is a symbolic representation for explaining the minimum selection stage N9 of the embodiments in FIGS. 1 and 2.

Starting from the displacement transducer of the accelerator pedal 10 there are also a line 103L to a detection stage 103, a line N11 to a threshold value stage N11, a line N7L with a switch N7 for locking onto the threshold value of the threshold value stage N11 and a line N9L with a minimum selection stage N9 for follow-up control of the threshold value of the threshold value stage N11. The control component $N11_{ST}$ of the threshold value stage N11 is connected by a two-way switch N8 either to the make contact of the switch N7 of the line N7L or to the output of the minimum selection stage N9 of the line N9L. With reference to FIG. 5, the following applies for the minimum selection stage:

c=a, when a<b c=a=b, when a=b c=b, when b<a where a and b are inputs, and c is the output, with a, b, c being analogous variables. The minimum accelerator pedal value to occur in the time period since the switch N8 has been actuated into the upper position is set at the output c of the minimum selection stage N9. As soon as the switch N8 is switched over again, the output c of the minimum selection stage N9 is reset to the current accelerator pedal value; i.e. in this lower position of the switch N8, the minimum selection stage N9 does not have any function.

In the changing-up line 212, there is a switch 101 arranged which can be driven by a monostable multivibrator 106 in the opening direction. The monostable multivibrator 106 can be triggered by a master slave multivibrator N1. The resetting input K of the master-slave multivibrator N1 is connected both to the output of an OR element N3 and to a negated input of an AND element N5. The other (non-negated) input of the AND element N5 is connected, together with the control component of the switch 101, to the output 106A of the monostable multivibrator 106. The output of the AND element N5 is connected to the control component of the switch N7. The output N11A of the threshold value stage N11 and the output 103A of the detection stage 103 are each connected to one of the two inputs of the OR element N3.

In series with the switch 101, a further switch 102 is arranged in the changing-up line 212, which switch 102 can be driven in the opening direction by a bistable multivibrator 108. The setting input S of the bistable multivibrator 108 is connected to the output 107A of an AND element 107. The section of the line N11 which starts from the output N11A of the threshold value stage N11 is routed to the resetting input R of the bistable multivibrator 108. The control component of the two-way switch N8 and the control component of the switch 102 of the changing-up line 212 are connected in parallel with the output 108A of the bistable multivibrator 108.

Figure 3:
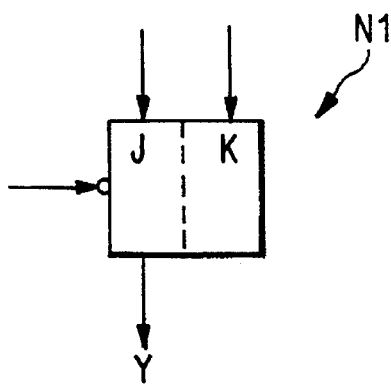
FIG. 3 shows a symbolic representation for explaining the J–K master-slave multivibrator N1 of the embodiments of FIGS. 1 and 2.

In the normal state, the switches 101, 102 and N7 are closed. The two-way switch N8 is then in its neutral position in which the control component $N11_{ST}$ of the threshold value stage N11 is connected to the make contact of the switch N7. With reference to FIG. 3, the J–K master-slave multivibrator N1 has, in addition to the two stable states J=1; K=0 and J=0; K=1 of a simple bistable multivibrator, a third state J=1; K=1 in which the change of level 0–1; 1–0 occurs in synchronism at the output. This state triggers constant setting at the monostable multivibrator 106 and, as a result, causes the unstable state to be continuously maintained. Thus, for the multivibrator N1 the following applies:

| J | K | Y |
|---|---|---|
| 0 | 0 | old value remains |
| 0 | 1 | 0 |
| 1 | 0 | 1 |
| 1 | 1 | clock (0/1 alternately) |

A signal level "1" is present at the output 103A of the detection stage 103 when the accelerator pedal is pressed down with the effect of increasing power. At the output 103A of the detection stage 103 a signal level "0" is present when the accelerator pedal is released in the direction of its neutral position or kept constant.

If the control component $N11_{ST}$ is connected via the switch N7 to the displacement transducer 10, the threshold value stage N11 is set to a value which is above the value corresponding to the instantaneous accelerator pedal position by a differential value (offset) corresponding to a constant displacement difference of the accelerator pedal.

Figure 6:
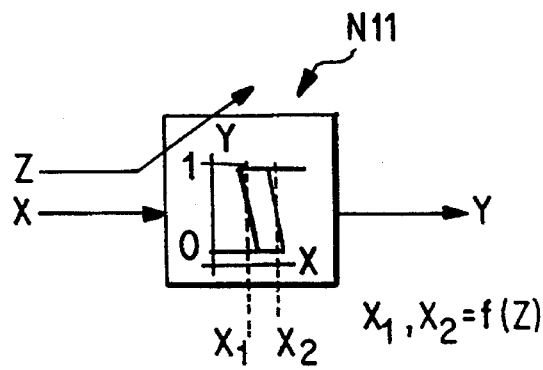
FIG. 6 shows a symbolic representation for explaining the threshold value stage N11 in FIGS. 1 and 2.

If the two-way switch N8 is in the neutral position and the switch N7 is opened, the instantaneous threshold value is kept in the threshold value stage N11, in other words, is locked onto. If the control component $N11_{ST}$ is connected via the minimum selection stage N9 to the displacement transducer 10, the threshold value is locked onto with respect to a deflection of the accelerator pedal with the effect of increasing power to the value instantaneously present when switching over the two-way switch N8 into the make position shown. In contrast, the control component $N11_{ST}$ is follow-up controlled downwards in the direction of its neutral position when the accelerator pedal is released, because the control component N1 1ST is then connected both to the output and to one of the inputs of the minimum selection stage N9 and the other input of the stage is connected to the displacement transducer 10, and because at the minimum selection stage N9 the output signal is equal to the respective smaller one of the two input signals. With reference to FIG. 6, the following applies for the threshold value stage N11:

| | |
|---|---|
| Y = 0 | for $x < x_1$ |
| Y = 1 | for $x > x_2$ |
| Y = old value | for $x_1 \leq x \leq x_2$ | where x=analog value

Y=digital value

Switch-on threshold $x_2$=Z+OFFSET

Switch-off threshold $x_1 = x_2$−HYSTERESIS $x_1$ and $x_2$ are locked onto old values if no signal is present at Z (open input).

For Z=x the following applies:

$x_2$=x+OFFSET (threshold is above the accelerator pedal position)

For "OFFSET"="HYSTERESIS" the following applies:

$X_1$=Z=x.

For the function of the threshold value stage N11, the threshold value control has a certain degree of inertia. That is to say, the change of $x_1/x_2$ as a function of Z takes place more slowly than the change of x. Here, there is the transition state x<x1 ——> Y=0.

In the embodiment in FIG. 1, the following further configuration is adopted:

The setting input J of the J–K master-slave multivibrator N1 is connected to the output of an AND element N $12_u$, one of whose inputs is connected, together with one input of the AND element 107, to that output of the control unit 21 from which the changing-up line 212 starts. The other input of the AND element $N12_u$ is connected to the output of an OR element $N12_o$ one of whose inputs is connected to the output 106 A of the monostable multivibrator 106 and the other input of which is connected to the output 108 A of the bistable multivibrator 108. The other input of the AND element 107 is connected to the output V4A of an AND element V4 which is used as a detection stage for the change of level of an inhibiting signal, one of the inputs of the AND element V4 being connected both to the output of a bistable multivibrator V2 and to the control component of a further switch V3 arranged in the changing-up line 212. The setting input S of the bistable multivibrator V2 is connected, together with the input of a negation element V5, to a connection terminal V1 to which an inhibiting signal $SP_{V1}$ which can be triggered independently of the actuation of the accelerator pedal 10, for preventing the changing-up, is provided. The output of the negation element V5 is connected directly to the other input of the AND element V4 used as a detection stage and via a delay element V6 to the resetting input R of the bistable multivibrator V2.

The re-authorization logic is actuated in the embodiment in FIG. 1 as follows:

When the inhibiting signal $SP_{V1}$ occurs at the terminal V1, the bistable multivibrator V2 is set and thus the switch V3 in the changing-up line 212 is opened. The output signal of the multivibrator V2 is present at the connected input of the detection stage V4. When the inhibiting signal $SP_{V1}$ is switched off, a signal with which the second input of the detection stage V4 and the input of the delay element V6 are fed is provided at the output of the negation element V5. During the delay time of the delay element V6, the output signal V4A of the detection stage V4 is present at the associated input of the AND element 107 while the switch V3 remains open. After the delay time of the delay element V6 has elapsed, the multivibrator V2 is reset and thus the switch V3 is closed.

In the event that, during the delay time of the delay element V6, a changing-up signal HS which is formed by the control unit 21, occurs at the second input of the AND element 107, the bistable multivibrator 108 is set and thus the switch 102 of the changing-up line 212 is opened. As a result, the changing-up signal HS and the output signal 108A of the multivibrator 108 are present at the respective input of the AND element $N12_u$ so that the setting input J of the J–K master-slave multivibrator N1 is led with a signal HS* formed by the changing-up signal HS. Also, the switch 101 of the changing-up line 212 is opened via the monostable multivibrator 106.

The re-authorization logic is thus initiated, the further operation of the logic corresponding to that of the re-authorization logic in the embodiment in FIG. 2 being described below.

Figure 2:
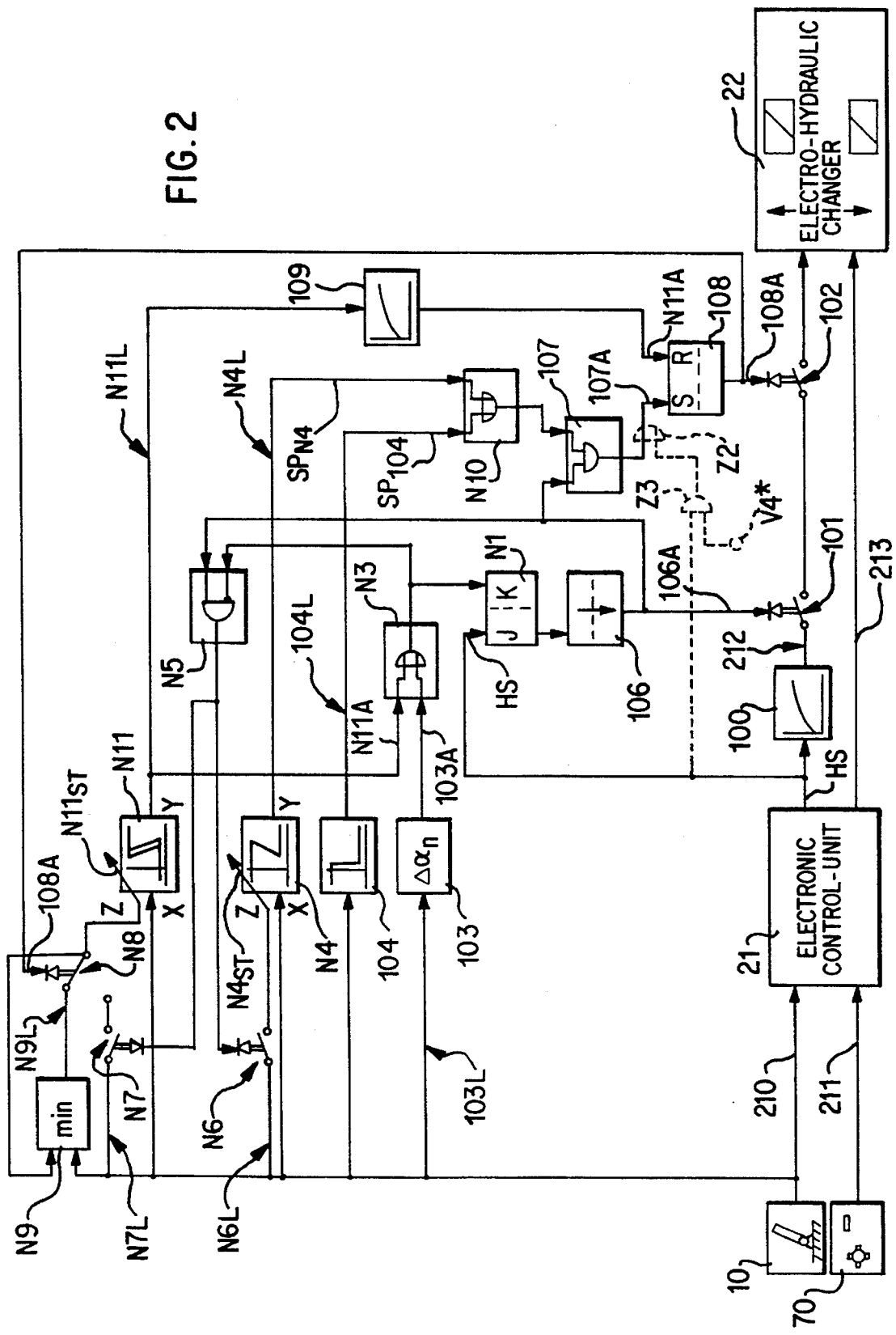
FIG. 2 shows a block circuit diagram of an arrangement according to another embodiment of the present invention for automatically changing a step-by-step variable transmission to a higher gear in which the inhibiting signal for preventing the changing-up is triggered by a rapid release of the accelerator pedal.

In the embodiment of FIG. 2, of addition to the features which are common to the embodiment of FIG. 1 and are described above, the following features are provided.

Figure 4:
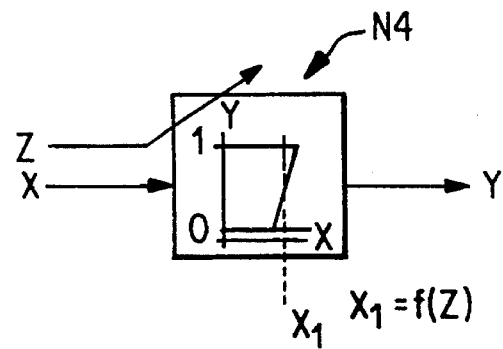
FIG. 4 shows a symbolic representation for explaining the threshold value stage N4 of the arrangement in FIG. 2.

Initially, the inhibiting signal for setting the bistable multivibrator 108 is triggered by a rapid release of the accelerator pedal. For this purpose, the displacement transducer 10 is connected to one of the inputs of an OR element N10 via a line N4L in which there is a threshold value stage N4. The output of the OR element N 10 is connected to the input, associated with the inhibiting signal, of the AND element 107. The threshold value stage N4 has a threshold value which can vary as a function of the position of the accelerator pedal. The control component $N4_{ST}$ of the threshold value stage N4 is connected to the displacement transducer via a line N6L which contains a switch N6. The control component $N4_{ST}$ operates when the switch N6 is closed in such a way that the threshold value corresponds to an accelerator pedal position which is closer to the neutral position than the instantaneous accelerator position by a specific constant offset. With reference to FIG. 4, the following applies for the threshold value stage:

| Y = 1 | for $x < x_1$ |
| Y = 0 | for $x > x_1$ |
| Y = old value | for $x = x_1$ | where x = analog value

Y = digital value threshold $x_1$ = Z – OFFSET $x_1$ is locked onto the old value if there is no signal preset at Z (open input).

For Z = x the following applies:

$x_1$ = x – OFFSET (the threshold is below the accelerator pedal position).

The control component of the switch N6 is connected to the output of the AND element N5, the switch being closed in the currentless state.

The other input of the AND element 107, which is influenced by the changing-up signal HS, is connected upstream of the setting input S of the bistable multivibrator 108 and is connected to the output 106A of the monostable multivibrator 106. The setting input J of the associated J–K master-slave multivibrator N1 is directly connected to the output of the control unit 21 for the changing-up line 212.

When a changing-up signal HS occurs, the monostable multivibrator 106 is immediately triggered and the associated switch 101 in the changing-up line 212 is opened. A delay element 100 which is arranged upstream of the switch 101 in the changing-up line 212 ensures that the switch 101 is already opened without the changing-up signal HS having previously acted on the changing device 22. The AND element N5 switches through when the output signal 106A of the monostable multivibrator 106 occurs at its non-negated input. Thus, as a result of the opening of the switch N6, the threshold value of the threshold value stage N4 is locked onto this threshold value being present as the switching-up line is passed through, i.e., during the occurrence of the changing-up signal HS. If the accelerator pedal is released during the delay time of the delay element N1J, 106, formed by the setting input J of the J–K master-slave multivibrator N1 and of the monostable multivibrator 106, by the offset corresponding to the offset of the threshold value stage N4, i.e., if the inhibiting signal $SP_{N4}$ which occurs when the threshold value of the threshold value stage N4 is overshot is present at the AND element 107 at the same time as the output signal 106A, the bistable multivibrator 108 is set. As a result, the changing-up line 212 is also opened by the switch 102 which is driven under these circumstances. Thus, the re-authorization logic is activated.

Solely for safety reasons, the input associated with the inhibiting signal of the AND element 107 can also be fed with a second inhibiting signal $SP_{104}$ of a threshold value stage 104 via the OR element N10. The threshold value stage 104 which has a constant threshold value which corresponds to an accelerator pedal position close to the neutral position is located in a line 104L which connects the second input of the OR element N10 to the displacement transducer 10. The threshold value stage 104 is used to limit the absolute accelerator pedal threshold to positive values in order to ensure that the prevention of the changing-up becomes effective at the idling point.

The re-authorization of changing-up is now described. With reference initially to FIG. 2, the threshold of the threshold value stage N11 is follow-up controlled downwards via the switch N8 and the minimum selection stage N9 provided the driver releases the accelerator pedal 10 further. Thus, for the re-authorization of the changing-up a constant displacement of the accelerator pedal (relative offset) always has to be effected in order to reset the bistable multivibrator 108 by means of the output signal N11A of the threshold value stage N11 via a delay element 109 and to close the switch 102.

However, this leads, via the OR element N3, to the constant resetting of the J–K master-slave multivibrator N1 to the state J=K=1 and, as a result, via the monostable multivibrator 106, to the opening of the switch 101. The delay time of the delay element 109 is selected to be just long enough to prevent the switch 102 from closing before the switch 101 opens. The delay element 109 thus has a function analogous with the function of the delay element 100.

The time constant within the changing-up delay which is now activated again is determined solely by the monostable multivibrator 106. However, this delay time cannot elapse until the threshold value stage N11 has been reset, and thus the K input of the J–K master-slave multivibrator N1 has been reset via the OR element N3. Assume the hysteresis of the threshold value stage N11 is selected to be equal in size to the relative accelerator pedal offset which determines the switching-on threshold. Then, if the switch 102 is also closed, as are the switches N7 and N8 by the change in level 1>0 at the output of the AND element N5 by the K input of the J–K master-slave multivibrator N1 being fed with the output signal of the threshold value stage N11, the switching off threshold value of the threshold value stage N11 is equal to the value of the instantaneous accelerator pedal position until, as a result of minimal release of the accelerator pedal (a certain degree of inertia of the threshold value follow-up control being assumed), the threshold value stage N11 switches off the output signal N11A. Because of simultaneous detection of this accelerator pedal release in the detection stage 103, this leads to the switching over of the OR element N3 and of the AND element N5 and thus to the opening of the switches N6 and N7 and to the final setting of the monostable multivibrator 106 and elapse of the time delay with the opening of the switch 101.

While the delay time is elapsing, the test for the rapid release of the accelerator pedal takes place in turn, which release would result in changing-up being prevented again by the opening of the switch 102 (as described above). The functions of the detection stage 103 and of the OR element N3 are essential for this prevention in order to prevent, in the entire region above the changing-up line, changing-up being carried out while the driver is accelerating.

Means that are matched appropriately to the driver's wishes for re-authorizing changing-up are thus provided by the present invention, which means are easy to trigger but at the same time prevent unmotivated changes.

Extended utilization of the re-authorization logic as well as for the accelerator pedal condition is now described. The re-authorization logic described above can also be utilized in an extended embodiment independently of the "rapid release of accelerator pedal" function. For this purpose, there is provision to extend it with the additional elements OR element Z2, connection terminal V4* (control input) and Z3 (AND stage).

To the extent that any other logic, not defined in greater detail here, leads to the prevention of changing-up, the described re-authorization logic can also be used there. This logic will be assumed to be located in the transmission control 21 in the block circuit diagram in FIG. 2. At the moment of the cancellation of this prevention condition, the re-authorization logic can be activated at the control input V4A in that the bistable multivibrator 108 is set via the OR element Z2 and, thus, the changing-up line 212 is interrupted by opening the switch 102. The re-authorization of the changing-up then takes place according to the method described above since the state, initiated with the opening of the switch 102, of the system is identical with that which is produced after the described trigger condition is fulfilled (state III).

Thus, the described condition for re-authorization of changing-up can be used, in addition to the accelerator pedal condition which is the basis of the embodiment in FIG. 2, in conjunction with any further conceivable prevention logic in order, also in this case, to prevent "unmotivated changing".

To summarize, three logic states which result from the states of the two multivibrators N1 and 108 can be distinguished in the system described:

State I:
Switch 101 and switch 102 are closed>no change activated or change under way.
State II:
Switch 101 open, switch 102>changing-up delay active, test accelerator pedal gradient.
State III:
Switch 102 open>changing-up is prevented.

Re-authorization logic when accelerator pedal condition is not present (FIG. 1):

When the inhibiting signal $SP_{v1}$ is cancelled (prevention condition no longer given), the bistable multivibrator V2 is not reset via the negation element V5 and the delay element V6 until after the bistable multivibrator 108 has been reset via the AND element 107; i.e. the switch 102 always opens before the switch V3 closes again.

This process corresponds exactly to the triggering of the re-authorization condition with the indicated control input V4* in FIG. 2. Thus, the representation with the elements V1 to V6 will also be conceivable for the embodiment in FIG. 2.

After the prevention condition is cancelled at the connection terminal V1 in FIG. 1 (corresponds to V4*=1), the re-authorization logic operates as for the embodiment in FIG. 2 since the logic state III is initiated with the setting of the bistable multivibrator 108. In this process, the J input of the J–K master slave multivibrator N1 is simultaneously set via the AND element $N12_u$ provided a changing-up instruction HS of the control unit 21 is present at the input of the AND element $N12_u$ in order to permit the later transition to the state II with the status "J=K=1" (analogous to the embodiment in FIG. 2). The fact that, in this case, the switch 101 is already opened in state III, at least for the delay time of the monostable multivibrator 106, remains without functional significance because of the switch 102, which is opened in any case. At the same time, the J input of the J–K master-slave multivibrator N1 remains set, analogously to the embodiment in FIG. 2, via the logic stage $N12_{uo}$ as long as the changing-up signal HS of the electronic control unit 21 is present.

However, there is a functional difference from the embodiment in FIG. 2 in the subsequent state II in which, now, the changing-up is enabled when the accelerator pedal is released with any speed or when the idling point is reached, since the corresponding condition does not apply here.

However, the actual re-authorization condition still applies in the form that, for the re-authorization of the changing-up, the driver must initially increase the accelerator pedal value by a specific relative offset (threshold N11) starting from the position of the accelerator pedal at the time of the lifting of the prevention logic, and must subsequently decrease this accelerator pedal value at least to a minimum extent (offset minus hysteresis N11) in order to obtain changing-up after a delay time (106) in which the driver cannot further increase the accelerator pedal value.

In the context of the observation concerning the logic states of the system, in the embodiment in FIG. 1 there is a fourth state, in which case the states I to III are to be considered to be analogous to the embodiment in FIG. 2. In the operation described, these four states are run through in the following sequence:

State I:
Switches 101, 102 and V3 are closed>prevention of changing is not activated.

State IV:
Switches 101 and 102 are closed, switch V3 is open>changing-up is prevented by condition $SP_{v1}$ State III:
Switch 102 is open, V3 is closed>changing-up prevented because of re-authorization condition.

State II:
Switch 101 is open, switches 102 and V3 are closed>changing-up prevented, test increase in accelerator pedal value.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Circuit for a speed-change gearbox which is coupled downstream of a drive engine in a power train of a motor vehicle, the circuit providing a changing-up signal for changing the speed-change gearbox to a higher gear, comprising:

an electronic control unit (21) forms a changing-up signal as a function both of a load (10) of the drive engine and of a driving speed (70) of the motor vehicle;

an electro-hydraulic changing device (22) connected by a changing-up line (212) to the electronic control unit (21) and receiving from the electronic control unit (21) the changing-up signal (HS);

a first switch (102) connected in the changing-up line (212), the first switch (102) being opened when the changing-up signal (HS) and an inhibiting signal ($SP_{v1}$) is present;

a bistable multivibrator (108) having a setting input (S) and a resetting input (R), and coupled to the first switch (102), said first switch (102) preventing the changing-up by setting the bistable multivibrator (108) when the inhibiting signal is present;

a detection stage (V4) responsive to a change in level of the inhibiting signal ($SP_{v1}$) for preventing the changing-up and outputting a signal (V4A) for setting the bistable multivibrator (108), with the resetting input (R) of the bistable multivibrator (108) for a re-authorization of the changing-up by closure of the first switch (102) being provided with a signal (N11A) which corresponds to a threshold position of an accelerator pedal (10) and which is output when the accelerator pedal has been actuated to at least the threshold position after the setting of the bistable multivibrator (108);

a displacement transducer controllably connected to the accelerator pedal (10);

a threshold value stage (N11) coupled between the displacement (10) transducer and the resetting input (R), the threshold value stage determining the threshold position;

a delay element (106, N1) switched on in response to the changing-up signal (HS) and coupled to a second switch (101), the second switch (101) being coupled in series in the changing-up line (212) with the first switch (102), the delay element (106, N1) during its delay time driving the second switch (101) in an opening direction;

wherein the threshold value stage (N11) has a threshold value which varies as a function of a position of the accelerator pedal (10) and is set to a constant offset above an instantaneous position of the accelerator pedal and is locked onto when the delay element (106, N1) is switched on, so that the threshold position deviates by a constant offset from an instantaneous position in which the accelerator pedal was located when the second switch (101) opens, and wherein the second switch (101) is additionally driven by a first delay device (106, N1, N3, N11) which operates as a function both of the delay element (106, N1), and of the threshold value stage (N11) such that the second switch (101) remains opened over a delay time determined by the first delay device (106, N1, N3, N11) when the signal corresponding to the threshold position occurs and switches on the first delay device (106, N1, N3, N11).

2. Circuit according to claim 1, wherein the second switch (101) additionally driven by a second delay device (106, N1, N3, N11) which operates as a function of the delay element (106, N1) and of the first delay device (106, N1, N3, N11) and also as a function of a second detection device (103) that detects direction of movement of the accelerator pedal (10) such that the second switch (101) remains opened over a first delay time determined by the second delay device (106, N1 N3, 103) if the second detection device (103) responds during the second delay time of the delay element (106, N1J) or the third delay time of the first delay device (106, N1, N3, N11) to a deflecting movement of the accelerator pedal (10) and a signal (103A) indicating said deflecting movement switches on the second delay device (106, N1, N3, 103).

3. Circuit according to claim 2, wherein the inhibiting signal ($SP_{v1}$) is independent of the actuation of the accelerator pedal (10) and the associated detection stage (V4) feeds a first one of two inputs of an AND element (107) with a signal (V4A) when the inhibiting signal is deactivated, the second input of said AND element (107) being fed directly with the changing-up signal (HS), and an output of said AND element (107) being connected to the setting input (S) of the bistable multivibrator (108) which drives the first switch (102) of the changing-up line (212).

4. Circuit according to claim 3, wherein the output of the bistable multivibrator (108) is connected to a first one of two inputs of an AND element (N12), the second input of which is fed directly with the changing-up signal (HS) and the output of which is connected to a setting input (J) of the J–K masterslave multi-vibrator (N1).

5. Circuit according to claim 4, wherein one of said two inputs of the AND element ($N12_v$) is connected to the output of an OR element ($N12_o$), that has a first input connected to the monostable multivibrator (106) and a second input connected to the bistable multivibrator (108).

6. Circuit according to claim 3, wherein the output signal (106A) of the monostable multivibrator (106), used to determine the delay times, feeds the setting input of the J–K master-slave multivibrator (N1).

7. Circuit according to claim 1, further comprising a monostable multivibrator (106) settable by a J–K masterslave multivibrator (N1), the monostable multivibrator (106) determining the delay times of the delay element (106, N1) and the two delay devices (106, N1, N3, N11 and 106, N1, N3, 103), the J–K master-slave multivibrator (N1) having setting input (J) that receives at least one of the changing-up signal (HS) and a signal (HS*) formed by the changing-up signal, the J–K master-slave multivibrator having a resetting input (K) effectively connected both to the threshold value stage (N11) for determining the threshold position and to the detection device (103) for the movement of the accelerator pedal.

8. Circuit according to claim 7, wherein a control component of a fourth switch (N7) for locking onto the threshold value is connected to the output of an AND element (N5) having a first input connected to the monostable multivibrator (106) used to determine the delay times and a second input that is negated and connected to a resetting input (K) of the J–K master-slave multivibrator (N1).

9. Circuit according claim 7, wherein the threshold value stage (N11) and the detection device (103) are each connected to one of two inputs of an OR element (N3) whose output is connected to the resetting input (K) of the J–K master-slave multivibrator (N1).

10. Circuit according to claim 1, wherein the locking onto the threshold value of the threshold value stage (N11) for determining the threshold position for a releasing movement of the accelerator pedal (10) is cancelled if the bistable multivibrator (108) which drives the first switch (102) of the changing-up line (212) is set, and in that the threshold value is follow-up controlled downwards upon a releasing movement of the accelerator pedal (10).

11. Circuit according to claim 10, wherein a control component ($N11_{ST}$) of the threshold value stage (N11) is alternately connected to one of two control lines (N7L and N9L), in order to determine the threshold position, by a third switch (N8) which is drivable by the bistable multivibrator (108) to thereby drive the first switch (102) of the changing-up line (212) with a first one (N7L) of the control lines having a fourth switch (N7) for locking onto the threshold value and connected in a neutral position to the control component, a second one (N9L) of the control lines containing a minimum selection stage (N9) for follow-up control of the threshold value and which is connected to the control component in a make position of the third switch (N8), in response to setting of the bistable multivibrator (108).

12. Circuit according to claim 1, wherein a second inhibiting signal ($SP_{104}$) is switched on as a function of actuation of the accelerator pedal (10), and the delay element (106, N1) is switched on to drive the second switch (101) of the changing-up line (212) directly by the changing-up signal (HS), and a detection device (107, 104) outputs a signal (107A) for setting the bistable multivibrator (108) for driving said first switch of the changing-up line (212) when the accelerator pedal has been actuated into the threshold position after the delay element (106, N1) has been switched on.

13. Circuit according to claim 12, wherein the threshold position for the setting of the bistable multivibrator (108) is determined by a second threshold value stage N4 which is connected in a control line (N4L) which at least indirectly connects the displacement transducer (10) to the setting input (S) of the bistable multivibrator (108).

14. Circuit according to claim 13, wherein the second threshold value stage (N4) has a threshold value which varies as a function of the position of the accelerator pedal (10) and which is adjustable to a constant offset below the instantaneous position and is locked onto when the delay element (106, N1) which drives the second switch (101) of the changing-up line (212) is switched on, so that the threshold position for the setting of the bistable multivibrator (108) for driving the first switch (102) deviates by the constant offset from that position in which the accelerator pedal was instantaneously when the second switch (101) opens.

15. Circuit according to claim 14, wherein a control component ($N4_{ST}$) of the second threshold value stage (N4) is connected to the displacement transducer (10) by a control line ($N4_{STL}$) which contains a fifth switch (N6) for locking onto the threshold value and the control component of the fifth switch (N6) is connected to a control component of the fourth switch (N7) for locking onto the threshold value of the threshold value stage (N11) for determining the threshold position of the accelerator pedal (10) in which the signal (N11A) for feeding the resetting input (R) of the bistable multivibrator (108) used for driving the first switch (101) of the changing-up line (212) is triggered.

16. Circuit according to claim 13, further comprising a further threshold value stage (104) with a constant threshold value for determining a threshold position which is located close to the neutral position of the accelerator pedal (10) and is connected in parallel with the first threshold value stage ($N_{11}$) for the setting of the bistable multivibrator (108) for driving the first switch of the changing-up line.

17. Circuit according to claim 16, wherein the setting input of the bistable multivibrator (108) is connected to the output of an AND element (107), with a first one of two inputs of the AND element (107) connected to the output of the delay element (106, N1) and the second input of the AND element connected to the output of an OR element (N10) whose two inputs are used for feeding the setting input with the signals of the second and further threshold value stages (N4 and 104) connected in parallel.

18. Circuit according to claim 12, wherein the setting input of the bistable multivibrator (108) is effectively connected to a detection stage (V4) for detecting the change in level of an inhibiting signal which is independent of the movement of the accelerator pedal, in order to prevent changing-up.

* * * * *